United States Patent [19]

Clegg

[11] Patent Number: 4,603,939

[45] Date of Patent: Aug. 5, 1986

[54] REVOLVING MAGNIFYING PRISMS

[76] Inventor: John E. Clegg, 2320 Keystone Dr., Orlando, Fla. 32806

[21] Appl. No.: 643,854

[22] Filed: Aug. 24, 1984

[51] Int. Cl.$^4$ .............................................. G02B 5/04
[52] U.S. Cl. ..................... 350/6.4; 350/286; 350/433
[58] Field of Search ................. 350/6.2, 6.4, 6.5, 286, 350/355, 433, 436, 484, 500–504

[56] References Cited

U.S. PATENT DOCUMENTS

| 2,405,960 | 8/1946 | Land. | |
| 3,253,525 | 5/1966 | Merkel | 350/436 |
| 3,884,548 | 5/1975 | Linder | 350/286 |
| 4,136,926 | 1/1979 | Sigler | 350/504 |

FOREIGN PATENT DOCUMENTS

| 897795 | 6/1944 | France | 350/436 |
| 119260 | 9/1979 | Japan. | |

OTHER PUBLICATIONS

Optical Engineering, Jul./Aug. 1974, vol. 13, No. 4.
Xerox Disclosure Journal, vol. 6, No. 5, Sep.-Oct. 1981.

Primary Examiner—John K. Corbin
Assistant Examiner—Lotta Ben

[57] ABSTRACT

Two prisms comprising a lower stage of four cylindrical members which refract and enlarge a beam in one dimension, and comprising an upper stage of four identical cylindrical members revolved 90° on the vertical axis so as to refract and enlarge the beam in the other dimension, thereby producing a magnified whole image of the object. The cylindrical members are longitudinal segments of hollow and whole cylinders, and each member has a planar face opposite a cylindrical face. Three of the members can be revolved so as to place the planar face at various angles to the beam and thereby produce a range of magnification from 0 to 50× when two stages are used and from 0 to 2500× when four stages are used.

1 Claim, 2 Drawing Figures

REVOLVING MAGNIFYING PRISMS

BACKGROUND

Prior art is limited to prisms with fixed integral faces which cannot be revolved, including the following patents;
1. Collimating System, U.S. Pat. No. 2,405,960, Aug. 20, 1946, E. H. Land. This device passes a beam of light through a prism as means of collimating the beam.
2. Luminous Flux Diverging Apparatus Using Prisms, Japan Pat. No. 119,260, Sept. 17, 1979, Kazuo Sanagi. This apparatus uses four unaligned prisms to concentrate a beam.

DRAWINGS

DESCRIPTION

Figure 1:
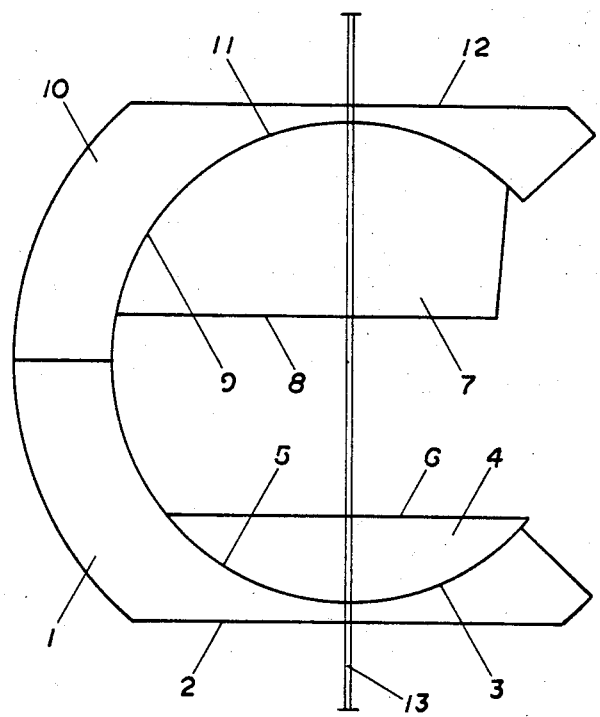
FIG. 1 is an elevation of the revolving magnifying prisms with the members set at 0 magnification.

FIG. 1 shows the lower stage of the revolving magnifying prisms with the members set at 0 magnification. Cylindrical member 1 is a longitudinal segment of a hollow cylinder with planar face 2 opposite concave cylindrical face 3. Cylindrical member 4 is a longitudinal segment of a whole cylinder mounted inside member 1 with convex cylindrical face 5 adjoining face 3 and with planar face 6 opposite face 5. Cylindrical member 7 is a longitudinal segment of a whole cylinder mounted inside member 10 with planar face 8 opposite convex cylindrical face 11. Cylindrical member 10 is a longitudinal segment of a hollow cylinder with concave cylindrical face 9 adjoining face 11 and with planar face 12 opposite face 9. All planar faces are perpendicular to incipient beam 13 which is transmitted through the prisms without magnification.

Figure 2:
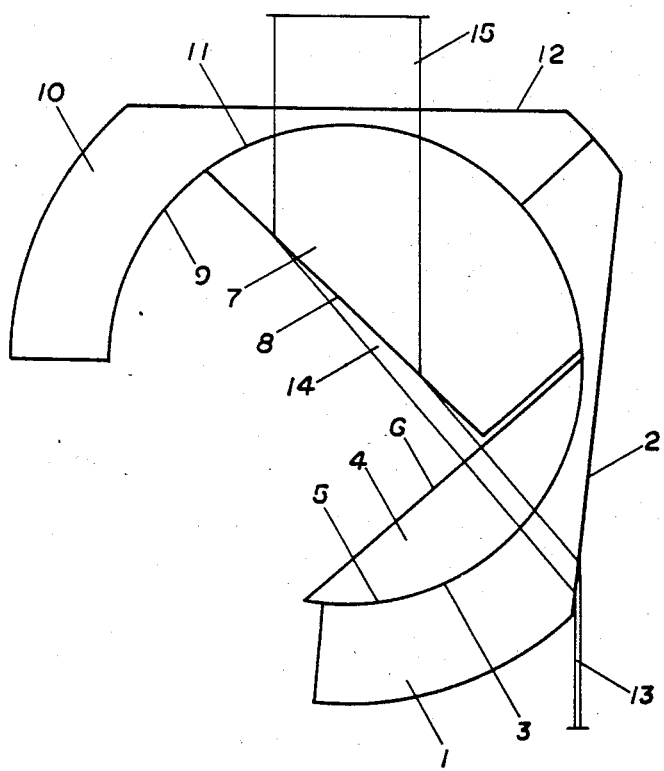
FIG. 2 is an elevation of the revolving magnifying prisms with the members set at 50× magnification.

FIG. 2 shows the prisms with members set at a maximum magnification of 50× in one dimension. Member 1 is revolved 84° counterclockwise, placing planar face 2 at an incident angle of 84° to incipient beam 13 and increasing the width of the beam by a factor of 7.07×, producing refracted beam 14. Member 4 is revolved 41.5° counterclockwise, placing planar face 6 perpendicular to refracted beam 14 which is emitted without refraction. Member 7 is revolved 43° clockwise, placing planar face 8 at an incident angle of 84° to refracted beam 14 and increasing the width of the beam by a factor of 7.07×, producing refracted beam 15. Member 10 occupies the same position as in FIG. 1, leaving planar face 12 perpendicular to refracted beam 15 which is emitted without refraction.

Two refractions of 7.07× produce a total magnification of 50× in one dimension. The upper stage prisms (not shown) of a prismatic microscope are identical to the lower stage prisms, with the members set in the same position and with the upper stage prisms revolved 90° on the vertical axis so as to enlarge refracted beam 15 in the other dimension, producing a whole image of the object magnified 50×. A four stage prismatic microscope will produce a total magnification of 2500×.

Magnifying prisms have the same total magnification of conical lenses, though two prisms are required to produce a whole image. Both magnifying prisms and conical lenses can produce multiple magnification of images and multiple concentration of beams. Magnifying prisms however have the singular advantage in that they can be revolved and thus increase the magnification of the object from 0 to 2500× by the turning of a knob.

I claim:

1. Revolving magnifying prisms comprising in general a lower stage consisting of four cylindrical members which can be revolved independently of each other, each member having a planar face which either transmits or refracts a light beam projected through the prisms as means of magnifying the beam in one dimension, and comprising an upper stage consisting of four cylindrical members identical to the four members of the lower stage but revolved 90° on the vertical axis of the prisms as means of magnifying the beam in the other dimension, and each lower and upper stage comprising in particular when revolved to positions of maximum magnification;

a cylindrical member (1) comprising a longitudinal segment of a hollow cylinder having a planar face (2) which refracts an incipient beam (13), forming a refracted beam (14), and having an opposed concave cylindrical face (3) which emits said refracted beam (14), a cylindrical member (4) comprising a longitudinal segment of a whole cylinder mounted inside said cylindrical member (1) and having a convex cylindrical face (5) adjoining said concave cylindrical face (3) so as to transmit said refracted beam (14), and having an opposed planar face (6) which emits said refracted beam (14), a cylindrical member (7) comprising a longitudinal segment of a whole cylinder mounted inside a cylindrical member (10) and having a planar face (8) which refracts said refracted beam (14), forming a refracted beam (15), and having an opposed convex cylindrical face (11) which transmits said refracted beam (15), and said cylindrical member (10) comprising a longitudinal segment of a hollow cylinder having a concave cylindrical face (9) adjoining said convex cylindrical face (11) so as to transmit said refracted beam (15), and having an opposed planar face (12) which emits said refracted beam (15).

* * * * *